US008657517B1

(12) United States Patent
Shinn et al.

(10) Patent No.: US 8,657,517 B1
(45) Date of Patent: Feb. 25, 2014

(54) DEVICE AND METHOD FOR PROVIDING VISUAL MAGNIFICATION AT THE TIP OF AN APPLICATOR BRUSH

(76) Inventors: Lauren Shinn, Blue Bell, PA (US); Lindsey Shinn, Blue Bell, PA (US)

( * ) Notice: Subject to any disclaimer, the term of this patent is extended or adjusted under 35 U.S.C. 154(b) by 542 days.

(21) Appl. No.: 13/033,586

(22) Filed: Feb. 23, 2011

(51) Int. Cl.
*B43K 29/00* (2006.01)
(52) U.S. Cl.
USPC ........... 401/195; 401/126; 401/129; 359/809; 359/810
(58) Field of Classification Search
USPC .......... 401/118, 126–130, 195; 359/803–805, 359/809, 810; 132/313, 317
See application file for complete search history.

(56) References Cited

U.S. PATENT DOCUMENTS

| | | | | | |
|---|---|---|---|---|---|
| 2,563,315 | A | * | 8/1951 | Den Uyl | 132/73.5 |
| 3,655,960 | A | * | 4/1972 | Andree | 362/119 |
| 4,398,800 | A | * | 8/1983 | Hayes | 359/818 |
| 6,476,984 | B1 | * | 11/2002 | Ringdahl | 359/803 |

* cited by examiner

*Primary Examiner* — David Walczak
(74) *Attorney, Agent, or Firm* — LaMorte & Associates, P.C.

(57) ABSTRACT

A container and applicator assembly that is used to hold and apply a liquid. The container has a threaded neck, through which the interior of the container is accessible. A removable cap is provided that selectively engages the threaded neck to create a leak-proof seal. An applicator brush extends downwardly from the center of the cap. The applicator brush extends into the interior of the container when the cap is engaged with the threaded neck. A support arm also extends from the cap. The support arm remains external to the container even when the cap is set. A magnifying lens is coupled to the end of the support arm. When the cap is separated from the container, the magnifying lens magnifies the bristle tip of the applicator brush. When the cap is set in place on the container, the magnifying lens magnifies a portion of the label.

18 Claims, 6 Drawing Sheets

DEVICE AND METHOD FOR PROVIDING VISUAL MAGNIFICATION AT THE TIP OF AN APPLICATOR BRUSH

BACKGROUND OF THE INVENTION

1. Field of the Invention

In general, the present invention relates to cosmetic applicator brushes, such as those used to apply nail polish, nail gloss, wart medicine and the like. More particularly, the present invention relates to magnifying devices that are used to better visualize the application of material using such an applicator brush.

2. Prior Art Description

Many commercial products are packaged in small containers that include applicator brushes. Such products are exemplified by nail polish, nail gloss, wart medicine, correction fluid, and the like. Traditionally, the applicator brush has a bristle head that is attached to a shaft. The shaft extends downwardly from the center of a threaded cap. In this manner, when the cap is affixed to the container, the brush extends into the material within the container. When the cap is removed, the brush lifts out of the container already primed with the material it is going to apply.

When a person is applying nail polish or applying correction fluid to a printed document, it is often required that the application of material be neatly controlled. A manicure can be ruined if nail polish is not neatly applied. Likewise, a document can be ruined if letters or words are accidentally deleted. Mistakes made in finely applying material with an applicator brush are often the result of poorly executed hand-eye coordination. Accordingly, better results can often be achieved if an applicator is used in a well lit environment. Better results can also be achieved under the assistance of optical magnification.

In the prior art, there are many illuminated magnifying lenses that can be mounted in fixed positions. Such magnifying lenses are often used by manicurists, podiatrists, and the like. Such devices require that both an applicator brush and the surface being affected be brought into range of the magnifying lens. However, the use of stationary magnifying stations in most situations is not practical.

A need therefore exists for an improved applicator system where a magnifying lens is affixed to the applicator brush, yet does not interfere with the ability of the brush to enter the container. In this manner, the tip of an applicator brush can be magnified and even illuminated in every environment in which it is used. This need is met by the present invention as described and claimed below.

SUMMARY OF THE INVENTION

The present invention is a container and applicator assembly that is used to hold and apply a liquid, such as nail polish or correction fluid. A container is provided that has an exterior and an interior. The container has a threaded neck, wherein the interior of the container is accessible through the threaded neck. A removable cap is provided that selectively engages the threaded neck to create a leak-proof seal.

An applicator brush extends downwardly from the center of the cap. The applicator brush extends into the interior of the container when the cap is engaged with the threaded neck. A support arm also extends from the cap. The support arm remains external to the container even when the cap is fully engaged with the threaded neck. A magnifying lens is coupled to the end of the support arm. When the cap is separated from the container, the magnifying lens magnifies the bristle tip of the applicator brush. When the cap is set in place on the container, the magnifying lens magnifies a portion of the label applied to the exterior of the container.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention can be utilized to hold many types of products, such as typing correction fluid, wart medication and the like, the present invention system is particularly well suited for use in holding nail polish fluid. Accordingly, in the exemplary embodiment of the present invention, the system is configured as a bottle of nail polish. This embodiment is selected in order to set forth the best mode contemplated for the invention. The illustrated embodiment, however, is merely exemplary and should not be considered a limitation when interpreting the scope of the appended claims.

Figure 1:
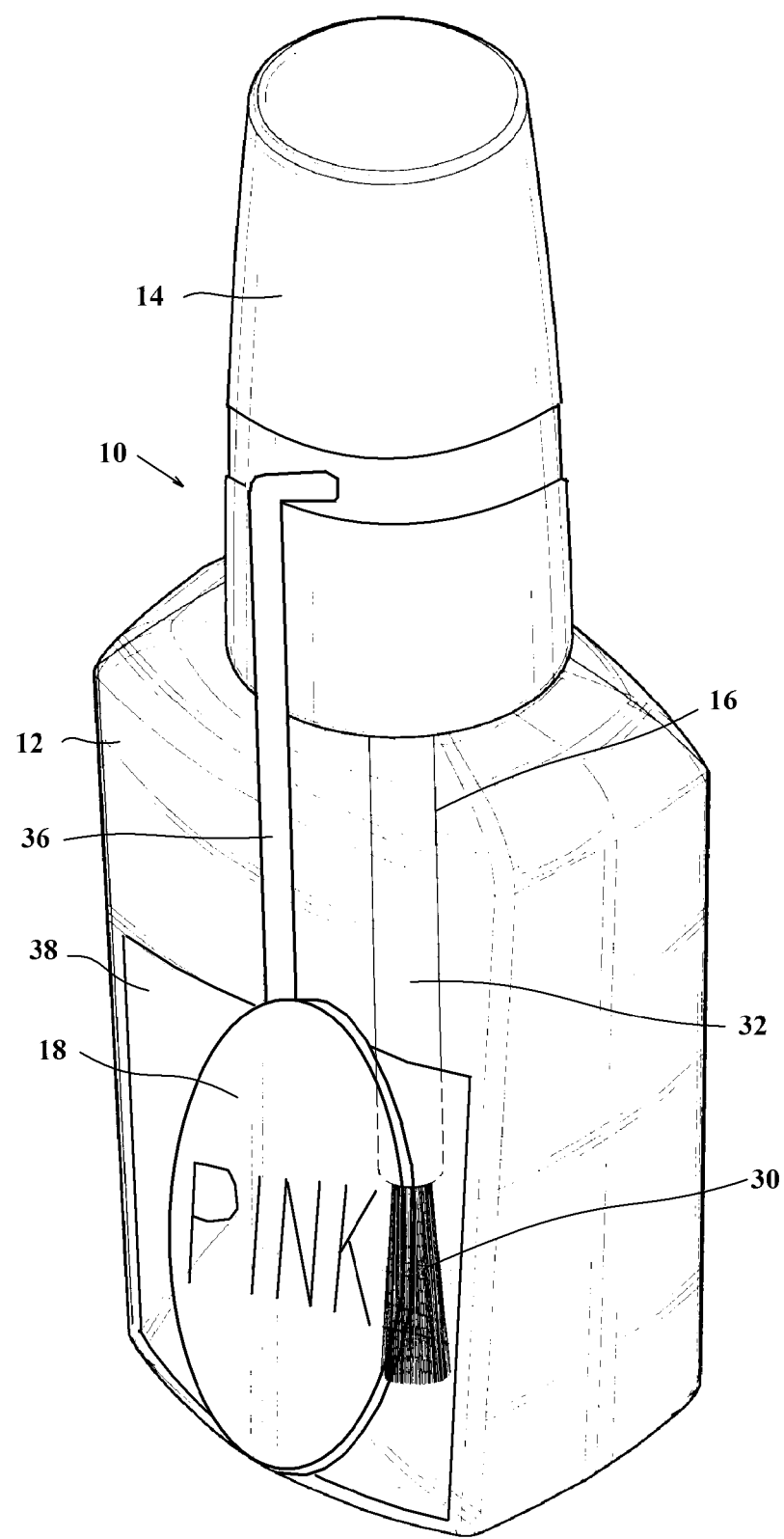
FIG. 1 is a perspective view of an exemplary embodiment of a container and applicator assembly in a closed condition.
Figure 2:
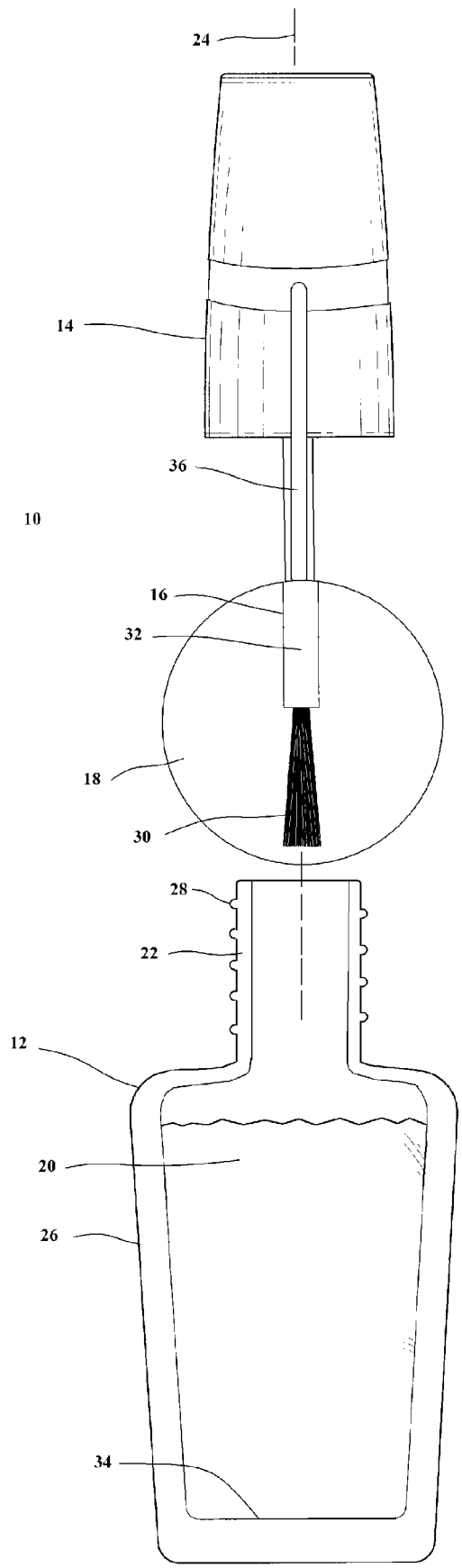
FIG. 2 is a perspective view of the exemplary embodiment of FIG. 1 in an open condition.
Figure 3:
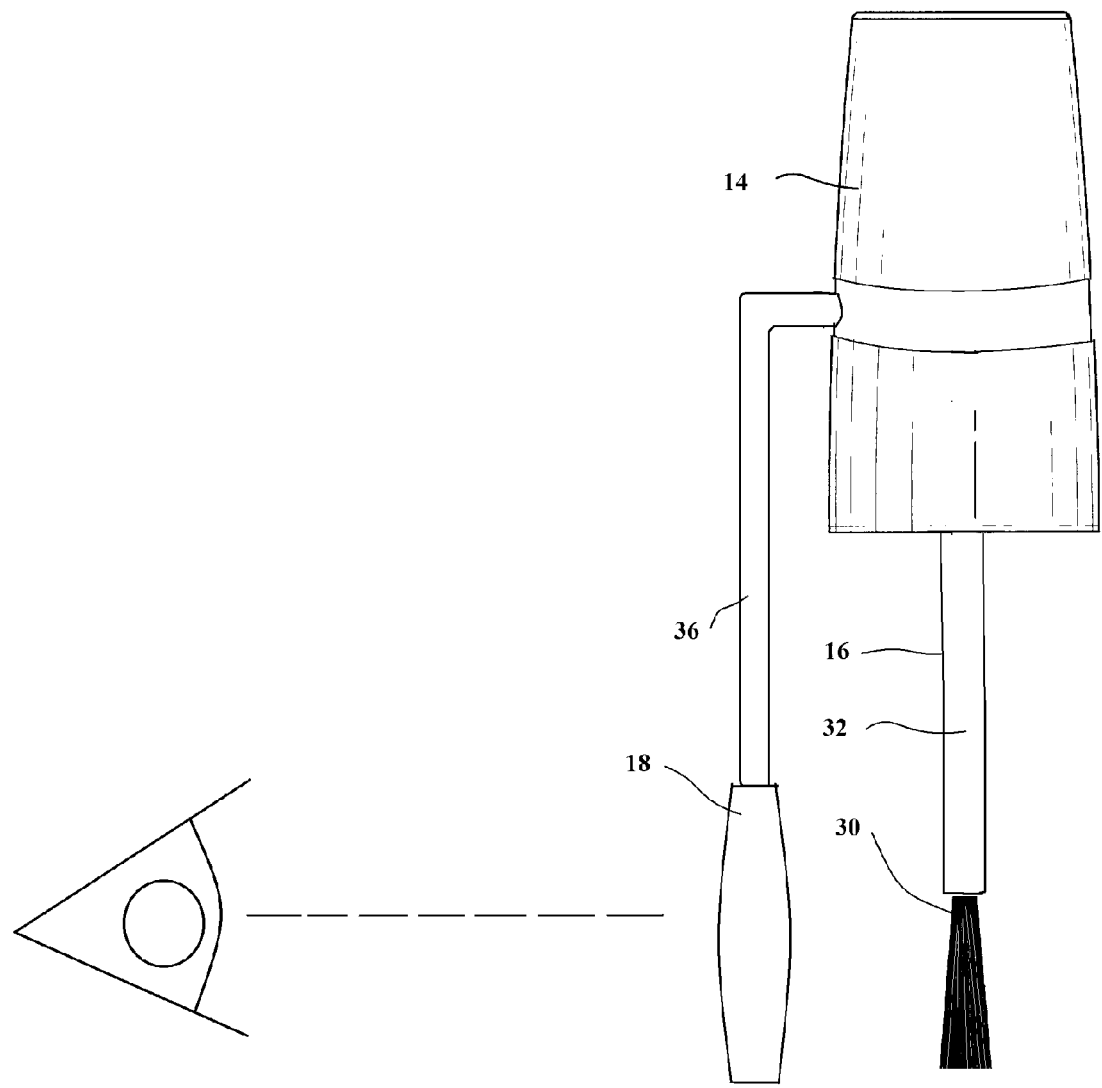
FIG. 3 shows a side view of the applicator of the exemplary embodiment.

Referring to FIG. 1 in conjunction with FIG. 2 and FIG. 3, an assembly 10 is shown that consists of a container 12, a cap 14, an applicator brush 16 and a magnifying lens 18. The container 12 is a tradition glass or plastic container that holds a small volume of liquid nail polish 20. The container 12 has a threaded neck 22. The neck 22 is the only access point through which the nail polish 20 can be removed from the container 12. The neck 22 is traditionally formed above the center of the container 12 so as to provide good access to all of the contents of the container 12. The neck 22 is symmetrically formed about an imaginary vertical axis 24. The container 12 may or may not be symmetrically formed about the vertical axis 24. Regardless, the side wall 26 farthest from the vertical axis 24 is a distance from the vertical axis 24 for the purposes of this description.

The neck 22 of the container 12 is externally threaded. The threads 28 on the neck 22 are sized and shaped to connect to corresponding threads on the interior of a cap 14. When the cap 14 is threaded onto the neck 22 of the container 12, a leak-proof seal can be created that prevents the nail polish 20 from leaking out of the container 12, should the container 12 tip or otherwise become inverted.

The applicator brush 16 extends downwardly from the center of the cap 14. The applicator brush 16 includes a shaft 32 and a bristle head 30. The length of the shaft 32 is designed to place the bristle head 30 in contact with the bottom surface 34 of the container 12 when the cap 14 is secured to the container 12.

A magnifying lens 18 is provided. The magnifying lens 18 can be glass but is preferably plastic so that it is less fragile and less expensive. The magnifying lens 18 is preferably a biconvex lens, however a Fresnel lens can also be used. The magnifying lens 18 is positioned so that the magnifying lens 18 is optically focused on the bristle head 30 of the applicator brush 16.

The magnifying lens 18 is held in this position by a support arm 36. The support arm 36 is anchored to the cap 14. The support arm 36 is shaped so that the support arm 36 extends farther away from the vertical axis 24 than does the furthest side wall 26 of the container 12. In this manner, the support arm 36 does not contact the exterior of the container 12 as the cap 14 is rotated and threaded onto the neck 22 of the container 12.

The support arm 36 can be molded as part of the cap 14 or can be retroactively added to the cap 14 in a secondary assembly procedure. The support arm 36 has a bent or doglegged shape that enables the support arm 36 to engage the cap 14 yet remain clear of the container 12 as the cap 14 is screwed onto the neck 22 of the container 12.

The support arm 36 holds the magnifying lens 18 so that the magnifying lens 18 is focused upon the bristle head 30 of the applicator brush. In this manner, when the cap 14 is removed from the container 12, a user can clearly see the bristle head 30 of the applicator brush 16 under magnification. This obviously helps a person use the applicator brush 16 to apply nail polish or any other material in a neat and controlled manner.

In addition to assisting in the application of nail polish, the magnifying lens 18 can be used to enhance the overall packaging of the product. When sold on a store shelf, the magnifying lens 18 is positioned outside of the container 12. As such, when viewed on a store shelf, the magnifying lens 18 will magnify some external surface of the container 12. The container 12 can contain a paper or printed label 38 that benefits from the available magnification. The label 38 can be printed with words or images that are specifically intended to be viewed by a consumer. In the exemplary illustrations, the color "PINK" is magnified. However, any other words or graphics can be used.

Figure 4:
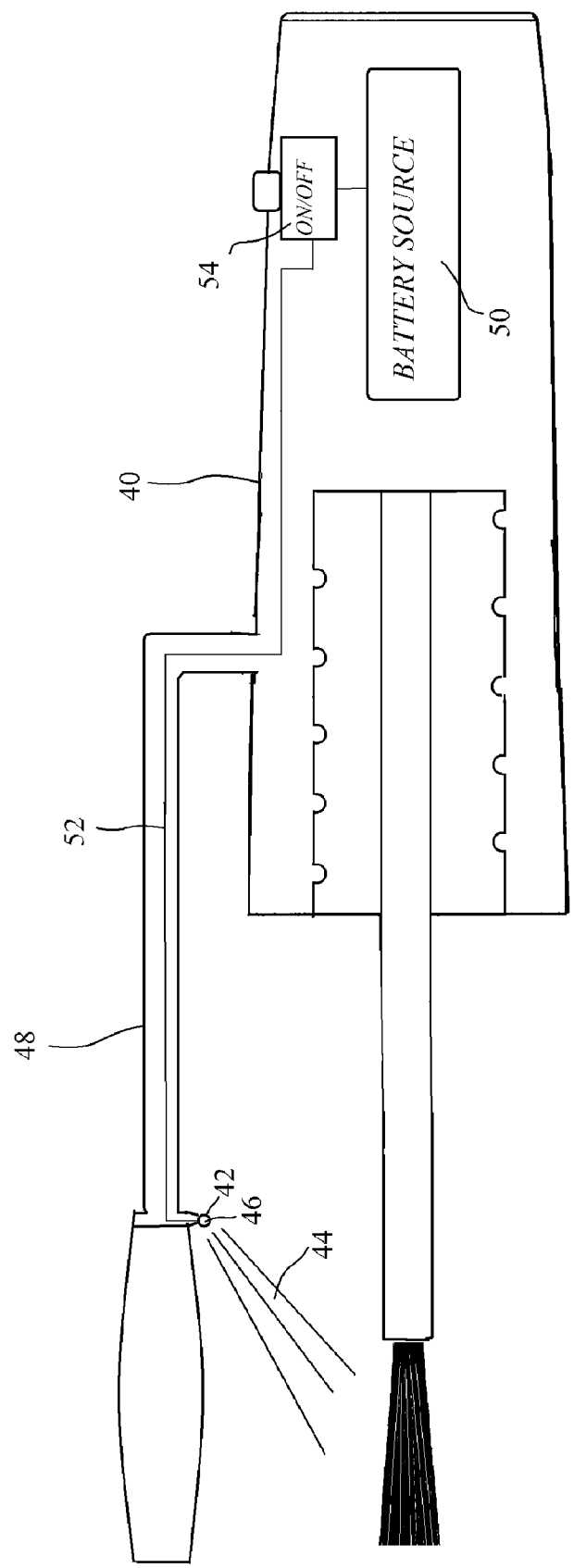
FIG. 4 is a cross-sectional schematic of an alternate embodiment of an applicator.

In the embodiment of FIG. 4, an alternate construction of the cap 40 is shown. In the earlier embodiment, the magnifying lens was merely supported by the cap. In the embodiment of FIG. 4, circuitry extends between the magnifying lens 18 and cap 40 so that a light source 42 can be provided at the magnifying lens 18. The light source 42 shines a beam of light 44 toward the bristle head 30 of the applicator brush 16. In this manner, the bristle head 30 can be both magnified and illuminated when in use.

In the embodiment of FIG. 4, at least one light emitting diode (LED) 46 is mounted to the support arm 48 near the magnifying lens 18. When activated, the LED 46 produces a beam of light 44 that is directed toward the bristle head 30 of the applicator brush 16. The LED 46 is powered by a battery source 50 that is contained within the structure of the cap 40. Wires 52 extend through or around the support arm 48 to convey power to the LED 46. An on/off switch 54 is also provided on the cap 40. The on/off switch 54 enables a person to selectively turn the LED 46 on and off as needed.

Figure 5:
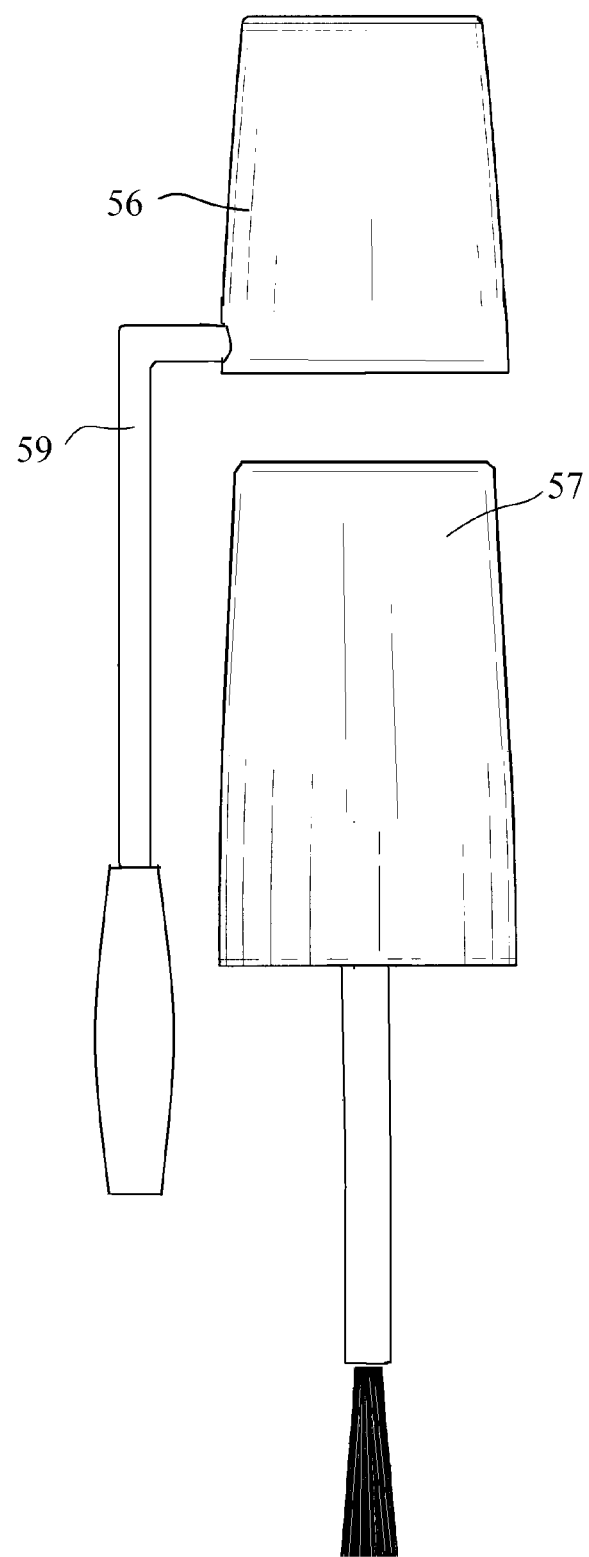
FIG. 5 is a side view of another alternate embodiment of an applicator.

In all previous embodiments, the magnifying lens 18 is permanently attached to the cap 14 of the container 12. However, this need not be the case. Referring to FIG. 5, it can be seen that a container 12 can be provided with a traditional prior art cap 57. An auxiliary assembly 55 is provided that includes a receptacle 56, a support arm 59 and a magnifying lens 18. The receptacle 56 is a structure that passes onto the cap 57 and engages the cap 57 with a fiction fit. The support arm 59 interconnects the receptacle 56 to the magnifying lens 18.

The embodiment of FIG. 5 shows that a prior art container 12 and cap 57 can be retroactively converted into the structure of the present invention by the addition of the auxiliary assembly. The auxiliary assembly can be sold separately for use with various existing products. It will be further understood that the illumination features of FIG. 4 can be included in the auxiliary assembly 57 of FIG. 5.

Figure 6:
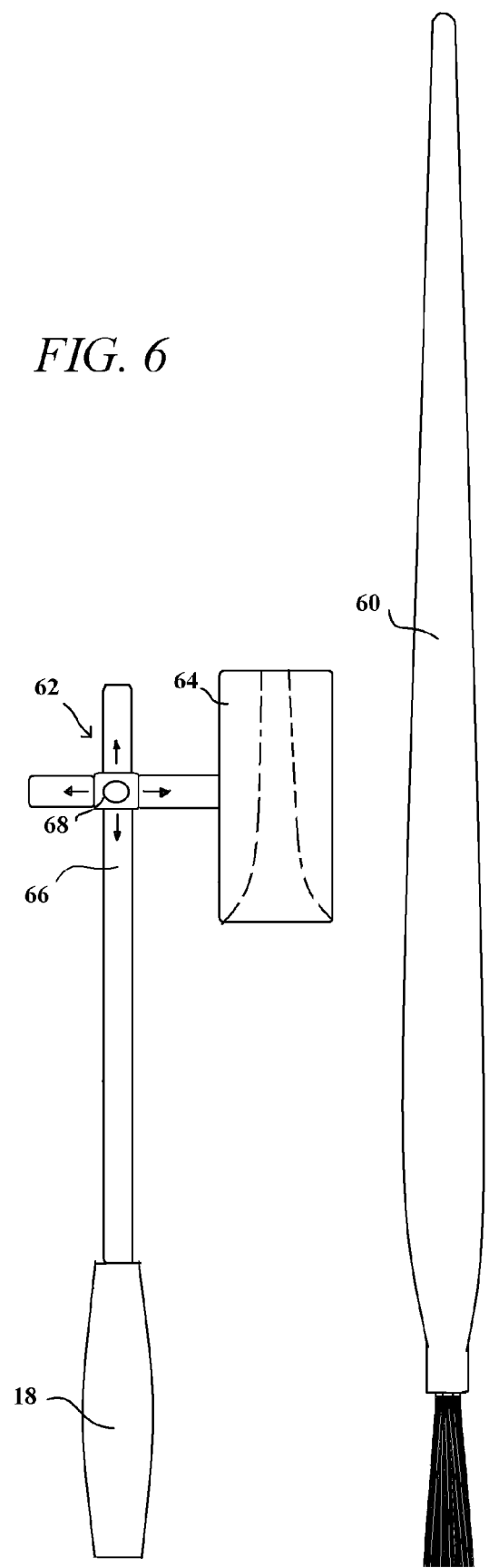
FIG. 6 is a side view of another alternate embodiment of a magnifier shown in conjunction with a prior art applicator.

In all previous embodiments, the magnifying lens 18 attaches to the cap of the container. However, this need not be the case. Referring to FIG. 6, it can be seen that a tradition nailbrush applicator 60 can be provided. Such applicators are commonly used in professional nail salons. An auxiliary assembly 62 is provided that includes a receptacle 64, a support arm 66 and a magnifying lens 18. The receptacle 64 is a structure that passes around the nailbrush applicator 60 and engages the nailbrush applicator 60 with a friction fit. The support arm 66 interconnects the receptacle 64 to the magnifying lens 18.

The auxiliary assembly 62 can be sold separately for use with various existing nailbrush applicators. It will be further understood that the illumination features of FIG. 4 can be included in the auxiliary assembly 62 of FIG. 6.

Also contained within the exemplary embodiment of FIG. 6 is an adjustable connection 68. The adjustable connection 68 enables the vertical and/or horizontal run of the support arm 66 to be selectively adjusted in length. Accordingly, the position of the magnifying lens 18 can be adjusted to match the needs of the user.

It will be understood that the embodiments of the present invention that are illustrated and described are merely exemplary and that a person skilled in the art can make many variations to that embodiments. For instance, the shape of the container and the shape of the cap are a matter of design choice. The shape of the magnifying lens can be altered. Materials other than nail polish can be held within the container. All such embodiments are intended to be included within the scope of the present invention as defined by the claims.

What is claimed is:

1. An assembly comprising:
   a container having an exterior and an interior, wherein said interior is accessible through a threaded neck;
   a removable cap that selectively engages said threaded neck;
   an applicator bush extending from said cap, wherein said applicator brush extends into said interior of said container when said cap is engaged with said threaded neck;
   a support arm extending from said cap, wherein said support arm remains external of said container when said cap is engaged with said threaded neck; and
   a magnifying lens coupled to said support arm.

2. The assembly according to claim 1, wherein said applicator brush has a bristle head, and wherein said magnifying lens is focused at said bristle head.

3. The assembly according to claim 1, wherein a label is disposed on said exterior of said container.

4. The assembly according to claim 3, wherein said magnifying lens is positioned to magnify at least a portion of said label when said cap is engaged with said threaded neck.

5. The assembly according to claim 1, further including a light source supported by said support arm.

6. The assembly according to claim 5, wherein said light source illuminates said applicator brush when said applicator brush is viewed through said magnifying lens.

7. The assembly according to claim 5, wherein said light source is powered by a battery source and said battery source is disposed within said cap.

8. The assembly according to claim 5, further including an on/off switch for selectively activating and deactivating said light source.

9. The assembly according to claim 1, wherein said support arm and said magnifying lens are selectively detachable from said cap.

10. A bottle of nail polish, comprising:
- a bottle holding a volume of liquid nail polish, wherein said nail polish is accessible within said bottle through a threaded neck;
- a removable cap that selectively engages said threaded neck;
- an applicator brush extending from said cap, wherein said applicator brush extends into said nail polish when said cap is engaged with said threaded neck;
- a support arm anchored to said cap; and
- a magnifying lens coupled to said support arm.

11. The assembly according to claim 10, wherein said applicator brush has a bristle head, and wherein said magnifying lens is positioned by said support arm to be focused at said bristle head.

12. The assembly according to claim 10, wherein a label is disposed on an exterior of said bottle.

13. The assembly according to claim 12, wherein said magnifying lens is positioned by said support arm to magnify at least a portion of said label when said cap is engaged with said threaded neck.

14. The assembly according to claim 10, further including a light source supported by said support arm.

15. The assembly according to claim 14, wherein said light source illuminates said applicator brush when activated.

16. The assembly according to claim 15, wherein said light source is powered by a battery source, wherein said battery source is disposed within said cap.

17. The assembly according to claim 15, further including an on/off switch for selectively activating and deactivating said light source.

18. The assembly according to claim 15, wherein said support arm is anchored to said cap with a friction interconnection.

* * * * *